United States Patent [19]

Legare et al.

[11] Patent Number: 5,062,874

[45] Date of Patent: Nov. 5, 1991

[54] FILTER SEALING APPARATUS

[75] Inventors: Pierre Legare, Ontario, Canada; David W. Pike, Salisbury, England

[73] Assignee: Her Majesty the Queen in right of Canada, as represented by the Minister of National Defence of Her Majesty's Canadian Government, Ottawa, Canada

[21] Appl. No.: 533,626

[22] Filed: Jun. 5, 1990

[51] Int. Cl.⁵ .............................................. B01D 50/00

[52] U.S. Cl. ....................................... 55/337; 55/316; 55/387; 55/502; 55/456; 277/1; 239/524

[58] Field of Search ................. 55/316, 456, 337, 387, 55/502, 456; 277/1; 239/524

[56] References Cited

U.S. PATENT DOCUMENTS

| | | | |
|---|---|---|---|
| Re. 27,466 | 8/1972 | Rosaen et al. | 156/74 |
| 3,116,880 | 1/1964 | Kuiker | 239/524 |
| 3,389,031 | 6/1968 | Rosaen et al. | 156/74 |
| 3,465,413 | 9/1969 | Rosaen et al. | 29/428 |
| 4,278,455 | 6/1971 | Nardi | 55/337 |
| 4,714,486 | 12/1987 | Silverthorn | 55/316 |
| 4,750,923 | 6/1988 | Haruta et al. | 55/337 |

FOREIGN PATENT DOCUMENTS

| | | |
|---|---|---|
| 0362920 | 4/1990 | European Pat. Off. . |
| 1247524 | 9/1971 | United Kingdom . |
| 1318773 | 5/1973 | United Kingdom . |
| 1446195 | 8/1976 | United Kingdom . |
| 1553926 | 10/1979 | United Kingdom . |
| 2140310 | 11/1984 | United Kingdom . |
| 2223423 | 4/1990 | United Kingdom . |

*Primary Examiner*—Bernard Nozick
*Attorney, Agent, or Firm*—Jerry A. Miller

[57] ABSTRACT

A filter canister assembly utilizes a sealant deflector to seal a particulate filter to the canister wall, even after the canister is sealed. The canister housing has a wall and an aperture with a particulate filter disposed therein. The particulate filter has an edge adjacent the wall, and is designed for removing particles of contaminants from a fluid, such as air, passed through the canister. A sealant deflector includes a plurality of vanes standing proud of a support substrate, and is situated between the aperture and the particulate filter and forms a permanent part of the canister assembly. The sealant deflector deflects a sealant in liquid state toward the wall to form a seal between the edge and the wall when the sealant is deposited on the sealant deflector while spinning. This deposits a sealant ring sealing the wall to the edge. The sealant deflector is self-centered under the aperture, by a bow-tie shaped structure of four arms extending outward radially from the sealant deflector connected in pairs by curved braces.

29 Claims, 5 Drawing Sheets

FILTER SEALING APPARATUS

BACKGROUND

1. Field of the Invention

This invention relates generally to the field of air filter canisters having particulate filter elements such as those used in conjunction with mask assemblies (e.g. industrial respirators) and the like. More particularly, this invention relates to an improved method and apparatus for sealing such filter elements to the walls of such filter canisters.

2. Background of the Invention

Air filter canisters are used in a wide number of industrial applications to provide protection against hazardous gases, vapors, aerosols, dusts and fumes. Many other environments also use or could use such filters, including military applications. Such filters commonly include one or several filter mechanisms. Typically such filters include a pleated paper filter element used to provide a large surface area of particulate filtering with minimal resistance to air flow and long life before the filter becomes clogged. The particulate filter may be used in conjunction with a charge of activated charcoal which may be doped with any of a variety of complexes or compounds to enhance its ability to adsorb or react with harmful vapors.

It is, of course, essential for such canisters to have a good seal at the periphery of the paper element adjacent the canister housing so that all of the air passing through the filter canister is forced to pass through the paper filter element (as well as other elements of the filter) to ensure maximum effectiveness of the filter. Otherwise, air (or whatever fluid is to be filtered) will pass through any gaps in the seal and the filter's effectiveness will be compromised.

Several matters must be taken into consideration when devising a sealing scheme for such filters. Since such filters are only useful for a limited time when exposed to the environment or use, they are produced and used in large quantities. Accordingly, production cost should be minimized and the time which any charcoal charge is exposed to the atmosphere during the production process should be minimized. Any liquid sealant which is used should, to the greatest extent possible, be limited to contacting the edge of the paper element (rather than the surface) so that the surface area of the particulate filter element is not reduced any more than necessary.

In a prior method, the paper filter was encapsulated into a metal cup-like retainer with air passages to form a subassembly. The sub-assembly was produced by placing the pleated paper filter into the cup-like retainer and placing that into a mold. A large metal disk which is slightly smaller in diameter than the filter element is placed on top of the filter element and then the assembly is spun. While it is spinning, an injection of urethane, or other sealant, is applied to the spinning disk.

The spinning disk distributes the urethane to the edge of the disk to mold the urethane to the shape of the mold into which the filter medium and retainer were placed. The disk is then removed and the sub-assembly is removed from the mold. This subassembly is then inserted into the canister body and sealed around its circumference with a bead of liquid sealant such as RTV silicone sealant in a secondary operation. This sealant is difficult to apply consistently, requires close supervision and adjustment of the bead of sealant, and requires an elaborate cure cycle. In addition, this process, for production requires use of numerous molds. The net result is a higher cost canister with greater possibility of increased scrap rates in production.

Filter canisters of the type generally related to the present invention are available commercially. Examples are the models P3 and PM3/TPM3/SP3 available from Racal Filter Technologies, LTD., 1175 California Ave., P.O. Box 665, Brockville, Ontario, Canada K6V 5V8. Similar styles of canisters are shown and described in, for example, U.S. Pat. No. 4,714,486 to Silverthorn as well as U.K. Patent Application No. 2,223,423 and European Patent Application No. 89202311.0 (Publication No. 0 362 920) both to Meunier which are hereby incorporated by reference. The Silverthorn reference briefly describes a polyurethane seal which is produced by spinning the canister so that the seal is forced to the edge of the paper element by centrifugal force. The U.K. application describes a compression seal arrangement.

Another spinning technique is disclosed in U.S. Pat. No. 3,389,031 (Re. 27,466) and U.S. Pat. No. 3,466,413 to Rosaen et al. in which a pleated filter is placed vertically inside a mold (pleats running side to side rather than top to bottom). The sealant is then poured into an opening in the mold while the mold is spun. Similar filter canisters are shown in U. K. Patent Application No. 2,140,310 to Ansite and U. K. Patent No. 1,247,524 to Etat Francais. Other filter sealing techniques are shown in U. K. Patent No. 1,318,773 to Starkie, U. K. Patent No. 1,446,195 to Carena, U. K. Patent No. 1,553,926 to Texas Research Institute, Inc. and U.S. Pat. No. 4,278,455.

The present invention, in its preferred embodiment, provides an improved method and apparatus for sealing a filter canister in a cost effective manner which minimizes reduction of paper pleated filter contamination with sealant. In addition, the present invention provides a mechanism for sealing the canister after the top has been applied without significantly affecting the flow resistance.

SUMMARY OF THE INVENTION

It is an object of the present invention to provide an improved method and apparatus for sealing a particulate filter to the wall of a filter canister.

It is an advantageous feature that the present invention provides such a method which can be easily implemented in production to produce the particulate filter seal after the canister housing has been assembled.

These and other objects, advantages and features of the invention will become apparent to those skilled in the art upon consideration of the following description of the invention.

In one embodiment of the present invention a filter canister assembly and process utilizes a sealant deflector to seal a particulate filter to the canister wall. The canister housing has a wall and an aperture with a particulate filter disposed therein. The particulate filter has an edge adjacent the wall, and is designed for removing particles of contaminants from a fluid, such as air, passed through the canister. A sealant deflector includes a plurality of vanes standing proud of a support substrate, and is situated between the aperture and the particulate filter and forms a permanent part of the canister assembly. The sealant deflector deflects a sealant in liquid state toward the wall to form a seal between the edge and the wall when the sealant is deposited on the sealant deflector while spinning. This deposits a sealant ring sealing the wall to the edge. The sealant deflector is self-centered under the aperture, by a bow-tie shaped structure of four arms extending outward radially from the sealant deflector connected in pairs by curved braces.

According to one aspect of the invention, a filter canister assembly having an inlet and an exhaust, includes a housing having a wall and an aperture defining one of the inlet and exhaust. A particulate filter having an edge and disposed within the housing with the edge adjacent the wall removes particles of contaminants from a fluid passed through the canister. A sealant deflector which is situated between the aperture and the particulate filter forms a part of the canister assembly and deflects a sealant in liquid state toward the wall to form a seal between the edge and the wall when the sealant is deposited on the sealant deflector while the sealant deflector is spinning.

According to another aspect of the present invention, a sealant deflector for deflecting sealant to a predetermined portion of a fluid filter includes a deflecting surface for receiving a quantity of sealant while the deflector is rotating and flings the sealant outward. A support substrate carries the deflecting surface. A fixing structure fixes the support substrate and thus the deflecting surface in a predetermined location within the fluid filter.

A method according to the invention for sealing a filter element of a fluid filter to an inner surface of a canister housing the fluid filter, includes the steps of: installing a sealant deflector as a permanent part of the filter canister housing; rotating the canister housing at a predetermined rotational speed; applying a predetermined amount of a sealant to the sealant deflector through an aperture in the housing as the housing is rotating; and continuing to rotate the housing for a period of time adequate to achieve dimensional stability of the sealant.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
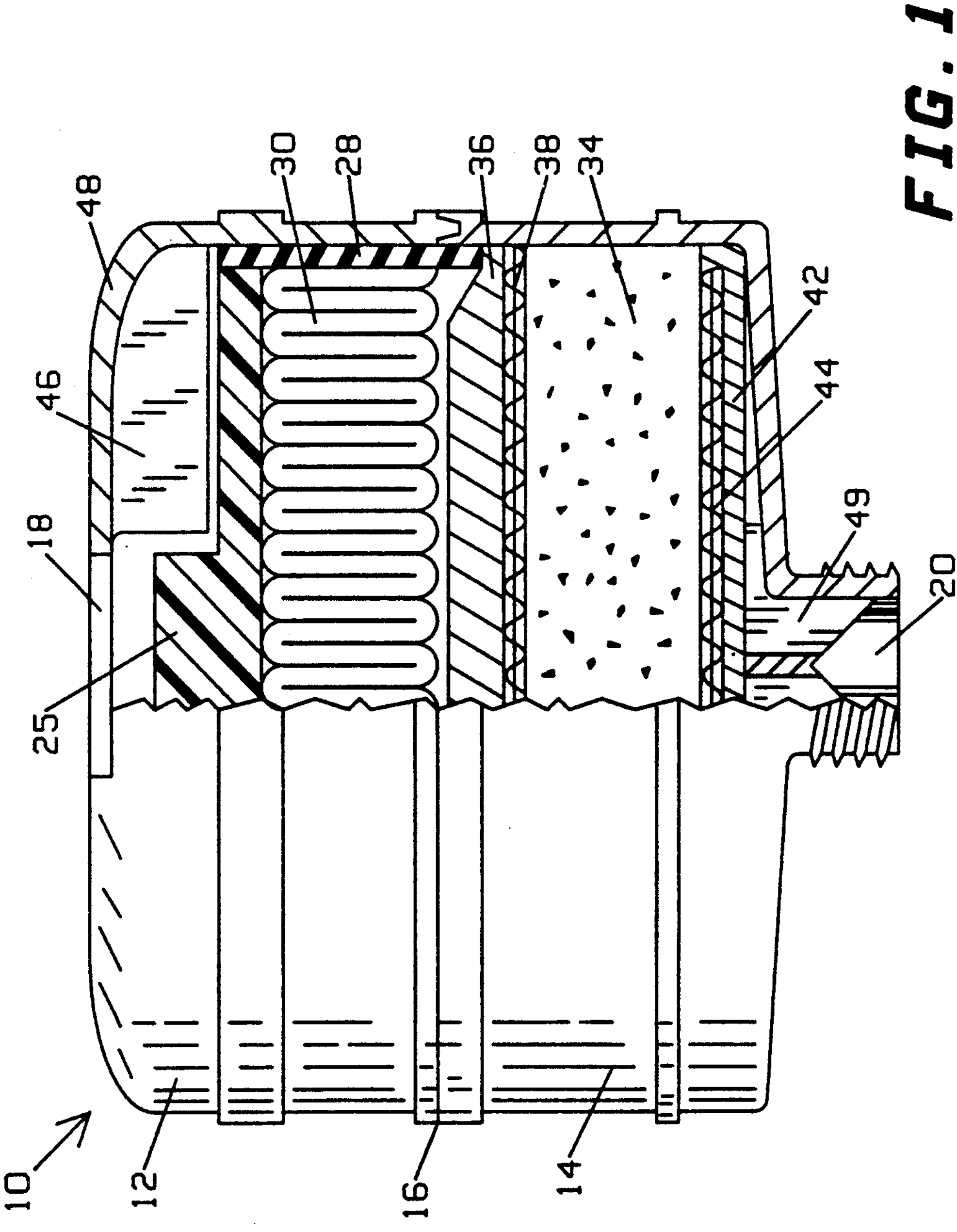
FIG. 1 is a partial sectional view of an embodiment of an assembled filter canister using an embodiment of the present invention.

Turning now to FIG. 1, a completed cylindrical respiratory filter canister 10 according to the present invention is shown in partial cross section. This canister is housed in a two part canister housing having a top 12 and a bottom 14 which are joined together at a seam 16. The canister housing may be made of metal, but is preferably made of nylon or plastic such as NORYL ® (a registered trademark of General Electric). The seam 16, in general, is formed at the point where the top 12 and bottom 14 are permanently joined together as, for example, by friction welding or adhesive.

The top 12 includes an inlet opening 18 through which air to be purified or cleansed passes. The bottom 14 includes an exhaust 20 through which cleaned air leaves the canister. As shown in the example of FIG. 1, the exhaust 20 includes male threads for tightly coupling the cleaned air to its destination (generally a mask, face shield or the like).

Directly beneath the inlet 18 is a sealant deflector 25 which will be described in greater detail throughout this description. Briefly, this sealant deflector 25 is used during the manufacturing process to deflect sealant, which is injected into the inlet 18, while the canister 10 is spinning. The injected sealant is deflected to the sides of the canister by centrifugal force to produce a ring of sealant 28. This sealant ring 28 encapsulates the edge of a pleated paper element 30 from the top of the filter element 30 to the bottom and affixes it firmly to the side walls of the canister 10.

Applicable filter canisters may include only a particulate filter element as described, or as in the example shown in FIG. 1, may also include another stage of filtration such as a carbon or charcoal filter. Canister 10 is shown to have a charcoal filter charge 34 which is packed into the canister 10 between a top retainer 36 with its associated fines filter element 38 and a bottom retainer 42 with its associated fines filter element 44. The fines filter elements 38 and 44 are used to contain dust from the activated charcoal filter load and prevent inhalation of such dust. Additionally, it provides a secondary level of particulate filtration.

The canister top 12 may or may not include rib-like structures 46 projecting downward from the wall 48 to reinforce the wall 48. Similarly, such ribs 49 may be provided in the wall of the canister bottom 14 if needed or desired. The pleated paper particulate filter 30 may also be fabricated using a plastic scrim as described in U.S. patent application Ser. No. 140,677, filed Jan. 4, 1988, which is hereby incorporated by reference. The filter may or may not include additional paper, fiber or cloth elements with or without the charcoal charge as required for the specific application at hand. Of course, many variations of the above filter structure are possible without departing from the present invention.

In many instances, the present structure serves to eliminate several structures required in the prior art. This can result in either a smaller canister or a larger charge of charcoal which provides advantages in many situations.

Figure 2:
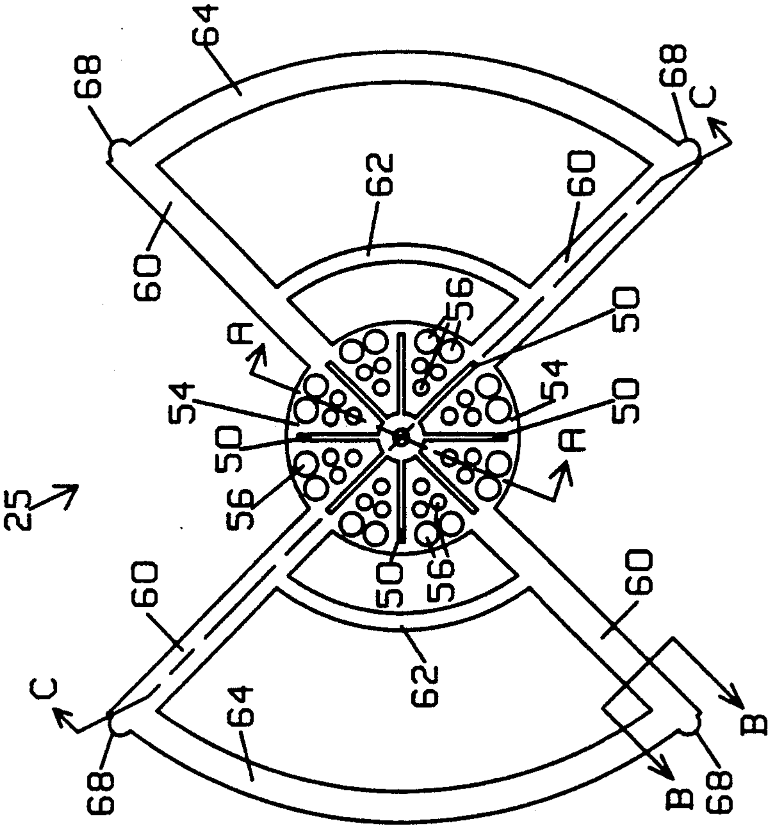
FIG. 2 shows a top view of the sealant deflector used in a preferred embodiment of the present invention.

Turning now to FIG. 2, a top view of a preferred embodiment of the sealant deflector 25 of FIG. 1 is shown. The section defined by section lines A—A is shown in FIG. 1. Upon consideration of the following description of the preferred sealant deflector 25, those skilled in the art will appreciate that many variations in the design of such a deflector are possible without departing from the present invention. In this embodiment, the frame of the sealant deflector is fashioned in approximately the shape of a bow-tie or butterfly wing pattern.

The central region includes a plurality of fins or vanes 50 extending radially from the center of the sealant deflector outward. The height of these vanes is not critical to the dispersion of the sealant so long as they extend upward from the central substrate 54 by several millimeters The illustration shows the vanes to extend much higher than this. The substrate 54 may include a plurality of apertures 56 to facilitate free flow of the fluid being filtered (e.g. air) through the filter. In another embodiment, the apertures 56 may be omitted so that when the inside of the filter is viewed through inlet opening 18 the paper element 30 is concealed from view and protected from puncture damage by items which might be purposely, accidentally or idly inserted through the inlet 18, thereby jeopardizing the integrity of the particulate filter. In such case, the substrate 54 is preferably at least as large or larger in diameter than the inlet 18.

In the embodiment of FIG. 2, four arms 60 extend radially outward from the substrate 54. An inner brace 62 and an outer brace 64 connect adjacent arms 60 to provide stability to the arms.

If the sealant deflector 25 is to be used with a canister housing having smooth sides, the arms 60 should extend beyond the junction of any outer brace 64 so that the brace does not rest closely against the canister wall forming a barrier to the sealant and preventing the sealant from flowing down the edge of the particulate filter during the sealing process. This is equivalently accomplished in the embodiment shown in FIG. 2 by providing small spacers 68 at the ends of each arm 60 to provide an adequate gap between the sealant deflector's outer braces 64 and the canister wall. For canisters with reinforcement ribs molded (or otherwise formed) on the inside of the canister in an area where the arms 64 would abut, there is no need for the spacers 68. Such ribs tend to perform the same purpose of spacing the arms 64 from the sides.

Other variations of this structure besides the somewhat "bow-tie" shape shown in FIG. 2 can also be used. For example, an X-shaped assembly having four arms without braces may be suitable. Similarly, three or more arms with or without brace structures or the like could be used to self-center the sealant deflector. Other self-centering structures will also occur to those skilled in the art.

During the canister's assembly process, the sealant deflector 25 is dropped into place inside the top 12. The pleated paper particulate filter 30 is then inserted inside the top 12 so that the sealant deflector 25 is sandwiched between the top 12 and the particulate filter element 30. The top 12 is then mated to the bottom 14. The arms 60 and the spacers 68 (if any) cause the substrate 54 and vane assembly 50 to be approximately centered with respect to the inlet 18. (However, if the sealant deflector 25 is not perfectly centered, the operation of the deflector does not generally seem to be impaired as long as it is close enough to present a good target for the sealant.)

The sealant, in liquid form, is injected or poured into the spinning canister 10 via inlet 18. (In other embodiments, the sealant could equivalently be poured through the outlet 20 with the sealant deflector positioned beneath the outlet.) The sealant strikes the top surface of vanes 50 and is hurled by centrifugal force to the side of the canister where it flows, also due to centrifugal force, down the edge of the canister housing adjacent the particulate filter element 30 and forms sealant ring 28. The top 12 of the canister in effect acts as a mold for the sealant. The sealant flows to the sides of the canister and begins building a layer of sealant toward the center of the canister until the supply of sealant is terminated. The top retainer 36 serves as a barrier to the flow of sealant toward the bottom of the canister.

Although the present embodiment is particularly designed for use in canisters having a cylindrical geometry, those skilled in the art will appreciate that the process and apparatus could be adapted to function in other environments.

In the preferred embodiment, a two part polyurethane sealant is used. The resin part is mixed with a catalyst just prior to being gravity fed into the canister opening. The canisters are spun for about 5 seconds during which time approximately 25 cc of sealant is injected. The canisters continue to spin for an additional 170 seconds during which time the sealant cures sufficiently to permit cessation of the spinning. To speed up the cure time, the process is carried out in the presence of a heater to raise the canister temperature somewhat to accelerate the cure time. The speed of rotation of the canisters in the above process (using the deflector shown in FIG. 2) is approximately 1400 RPM. Of course, these specifics are adapted to a filter canister having an inner diameter of approximately 10.4 cm, a pleated paper element which is approximately 1.7 cm thick, a deflector having eight vanes and employing a two part polyurethane system. These specifications are, of course, not to be limiting and are intended only to be illustrative.

The rotational speed can be determined experimentally or calculated. Since there is some variability in the viscosity of the sealants used for such purposes, this should be taken into consideration. The speed must be adequate to impart sufficient energy to the sealant to fling it to the walls of the canister to prevent having the sealant unnecessarily clog, mark or contaminate the particulate filter surface. When a minimum speed has been established, a measure of additional speed should be used to provide a safety margin of, for example, 10% to 50%. The amount above this minimal speed is not critical and can be selected to use standard motor speeds, pulley sizes, etc.

Figure 3:
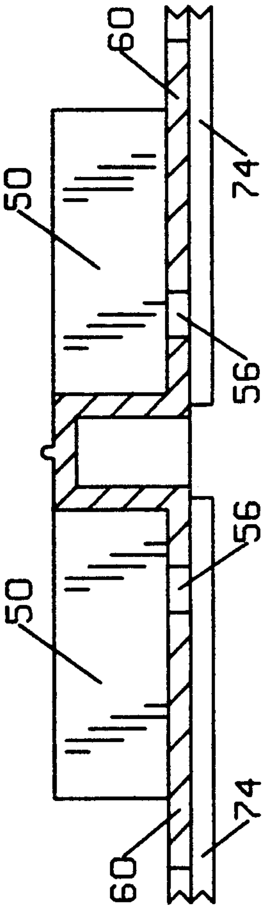
FIG. 3 is a sectional view of the sealant deflector of FIG. 2 taken along lines A—A of FIG. 2.

Turning to FIG. 3, the section taken along lines B—B of FIG. 1 is shown. The vanes 50 are seen to stand proud of the substrate 54. In use, the sealant only tends to drop down over the sides of the vanes 50 by about one millimeter or so (depending, of course, upon the velocity of rotation, etc.). Thus, it is anticipated that the height of the vanes 50 need only stand above the substrate 54 by about this amount to serve their primary purpose. It may be desirable for them to stand higher so that they further serve to space the paper element 30 from the top 12. The center point of the vane assembly where each of the vanes converge may be used as a location for the injection gate 72 for molding the sealant deflector which can be made of any suitable material such as nylon, polyethylene, ABS etc.

Figure 4:
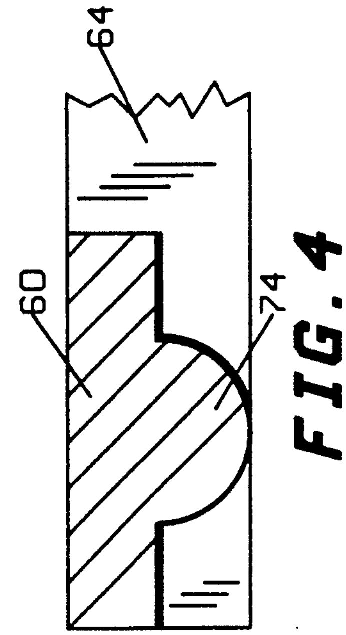
FIG. 4 is a sectional view of the sealant deflector of FIG. 2 taken along lines B—B of FIG. 2.

To minimize the amount of filter surface area obstructed by the arms 60, it is preferable to incorporate a semicircular rib 74 along the underside of arms 68 as seen in profile in the sectional view of FIG. 4 taken along line C—C of FIG. 2. Tapered geometries could provide the same function. With such ribs 74, only the bottom of the radius of the rib touches the pleated paper particulate filter element 30 and since it only touches the tips of the pleats or the plastic scrim surrounding the pleats, very little flow impedance is produced by the presence of the sealant deflector. This would likely be the case even if a fiber or cloth element were placed directly beneath the sealant deflector 25 due to the small obstruction in surface are produced.

Figure 5:
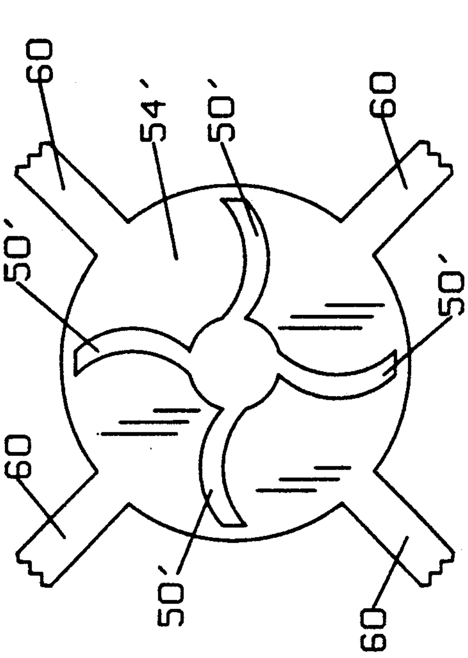
FIG. 5 shows a partial top view of an alternative embodiment of the present invention using a reduced number of curved vanes.

Many variations of the sealant deflector 25 will occur to those skilled in the art. For example, referring to FIG. 5, the vanes 50′ may be curved as shown similar in design to the impeller of a fluid pump. The substrate may be made as shown without apertures 56. In other embodiments, other geometries of deflector surfaces such as a raised disk, cone or concentric cone shapes may be suitable. Raised disks and cone shapes are similar in that they both have a circular edge from which the sealant is hurled toward the housing wall by centrifugal force. Similarly, the number of vanes may be varied as well as the number of arms 60. It is, however, preferred to minimize the volume occupied by the sealant deflector 25 in order to reduce both the cost of the part and obstruction of air flow, since the deflector remains a part of the finished canister.

Figure 6:
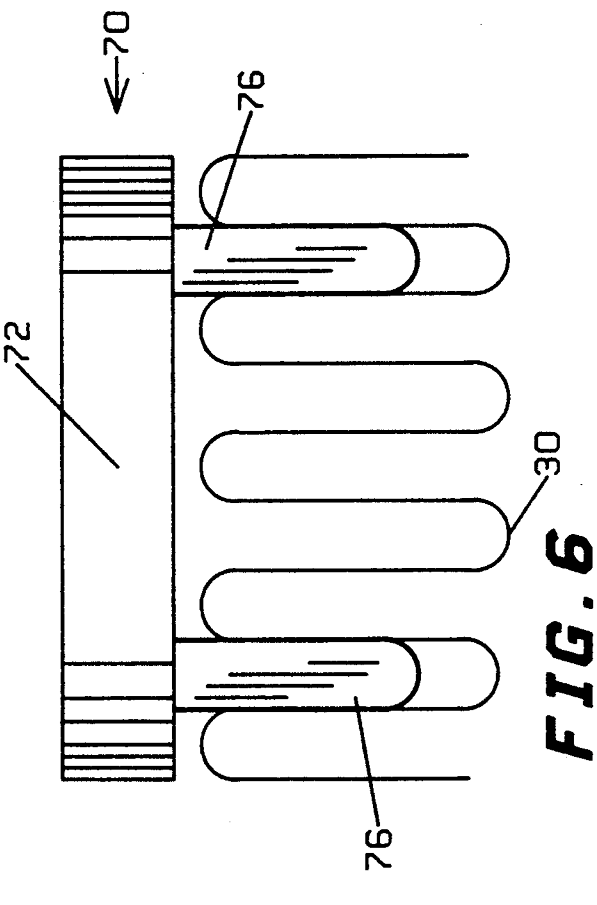
FIG. 6 shows an alternate embodiment of the present invention in which the sealant deflector is held in place by legs which are inserted between pleats of the paper filter element.

Referring to FIG. 6, another embodiment of the present invention is shown. In this embodiment, a sealant deflector 70 is fashioned in the form of a small disk 72 which forms the deflector surface. The deflector disk 72 is held in place by a pair of legs 76 which are inserted between adjacent pleats of the pleated filter element 30. The legs 76 may be solidly affixed in place by a suitable adhesive if required, or may simply be retained in place by friction. If held in place by friction, serrations, textures or the like may be molded into the surface of the legs to assist in holding them in place. Similarly the shape and angle of the legs may be used to hold the deflector more securely.

Although a small disk deflector 72 is shown in FIG. 6, this should not be limiting since vanes or other deflection structures may be used without departing from the present invention. Since the urethane deflector's of the present invention remain as part of the finished assembly, the disk is preferably relatively small so that minimal obstruction of air flow takes place. Since the structure of FIG. 6 is not self centering, it is manually placed in a central area of the filter element 30.

Figure 7:
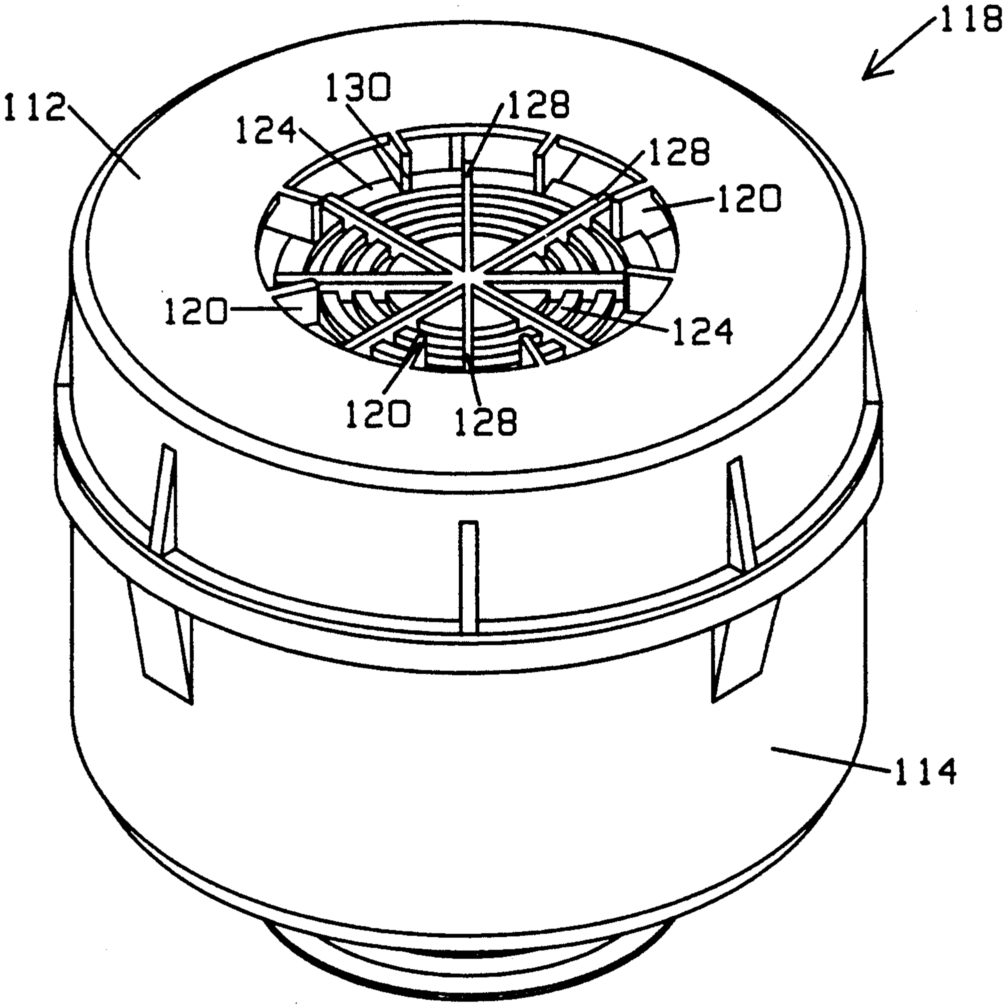
FIG. 7 shows an alternate embodiment of the present invention in which the sealant deflector is built as an integral part of the canister housing.

A further embodiment of the present invention is shown in perspective in FIG. 7. This embodiment similarly has a top 112 and a bottom 114 forming a canister housing 118. This housing is preferably molded of plastic and incorporates reinforcement ribs 120 molded in the top 112. Beneath the inlet and supported by the ribs 120 is a support substrate 124 shaped somewhat like a spider web in this embodiment. This substrate 124 supports an array of deflector vanes 128. In the embodiment shown, the deflector vanes 128 are shaped similar to those in FIG. 2, but in light of the present discussion, it is clear that this should not be limiting since it has been pointed out that many such structures and geometries will function.

The deflector vanes 128 are disposed such that they point outward in between each of the reinforcement ribs 120. If they were aligned with the reinforcement ribs 120, a small amount of sealant would land on the edge 130 of the reinforcement ribs 120 and follow the contour of the edge to the top surface of the canister top 112. Since some amount of sealant will likely strike the edge 130 anyway, it is desirable to either round over this edge 130 or mold it to a knife-like edge. This way any sealant which strikes the edge 130 will be more inclined to flow radially toward the canister's inner sides rather than upward toward the canister top 112. To further attempt to prevent this occurrence, it is desirable to provide a minimal draft angle for the structure within the aperture. This helps ensure that the path of least resistance to sealant flow is outward toward the inner sides of the canister housing rather than up to the canister's outer top surface. In this manner, substantially all of the sealant is deflected to the desired location inside the canister.

Although the present embodiment illustrates a sealant deflector which is molded as an integral part of the housing, those skilled in the art will appreciate that many variations of this concept are possible. For example, a sealant deflector may be fabricated to snap into position on the underside of the canister top to form a similar assembly which is not limited by the requirements of a single mold.

Any number of sealants can be used in conjunction with the present invention In order to minimize production time, a fast curing sealant such as two part epoxy or two part urethane is preferred. Such sealants can be mixed (resin plus catalyst) in an in-line mixing chamber just prior to injection into the canister. Other sealants such as hot melt could also be used, however, without departing from the present invention.

Figure 8:
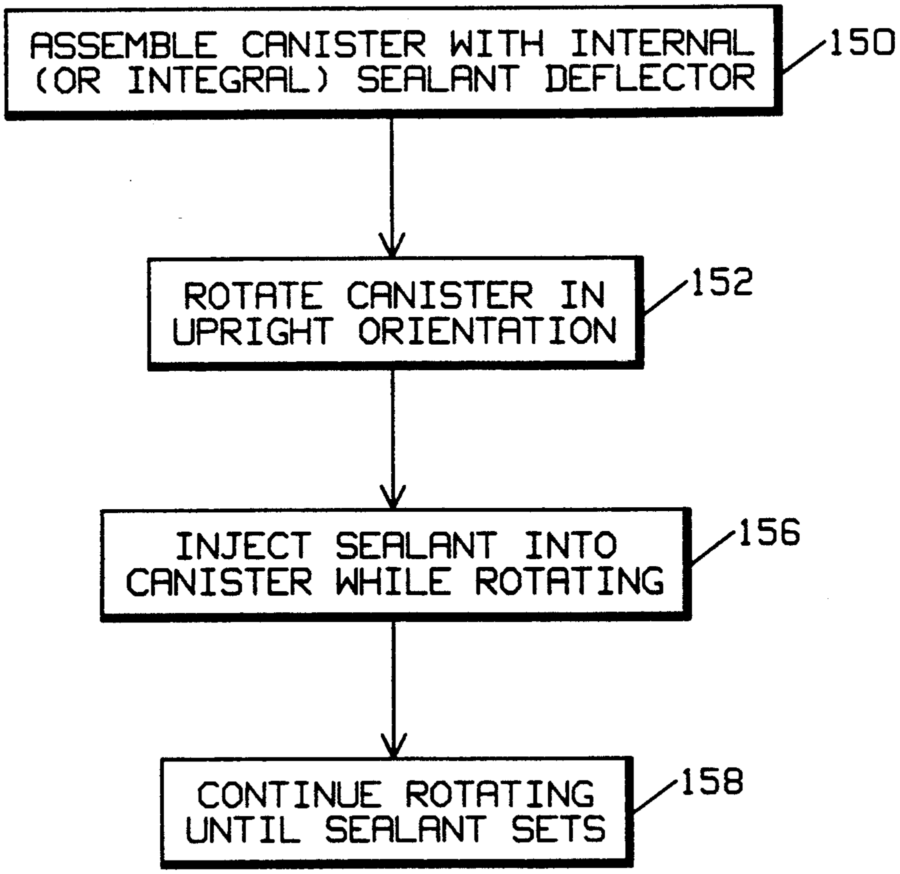
FIG. 8 is a flow chart of the general process used for sealing a filter in accordance with the present invention.

The process used in the present invention is described in general terms in the flow chart of FIG. 8. In the preferred embodiment of the process, the canister is assembled and sealed with the sealant deflector either inside the canister (as in FIG. 2 or FIG. 6) or forming a part of the canister housing (as in FIG. 7) at step 150. The canister is then placed in a fixture for rotation at a suitable speed at step 152. The canister is oriented horizontally with an access aperture (either inlet or outlet) facing up. Sealant is then injected or poured into the rotating canister so as to strike the rotating sealant deflector surface in an adequate quantity to fully seal the particulate filter(s) to the walls of the canister at step 156. The rotation of the canister proceeds beyond the time required to dispense the sealant at step 158 until an adequate time has passed to assure that the geometry of the resultant sealant ring is stabilized. The canister can then be removed from the fixture that rotated it and can be further processed (e.g. affixing labels, testing, packaging, painting, etc.).

This process, as has been described throughout, permits the process of sealing the particulate filter element(s) to the canister housing after assembly of the housing so that a secondary operation is not required. However, the process may equally well be carried out, in some embodiments, as part of a secondary operation. For example, where a particulate filter is to be sandwiched between other filter elements, the method and apparatus described herein can be equivalently carried out to seal the sandwich assembly. Similarly, where more desirable, the sealant can be injected or poured into an opening in the canister bottom where appropriate by positioning the canister upside down for the rotation and injection process.

Although the present invention has been described with several particular embodiments and variations thereof, many other variations will occur to those skilled in the art. For example, the present process can be used with other particulate filters besides pleated paper as in the preferred embodiments. Similarly, although the preferred canisters are intended for respiratory applications, the same process could be used for water filters and other types of filters. The present sealant deflector can be made of a variety of materials and the dimensions and geometries can be appropriately adapted to numerous filter applications.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. A filter canister assembly, comprising:
a housing having a wall and an inlet and an outlet;
particulate filtering means, having a peripheral edge and disposed within said housing with said peripheral edge adjacent said wall, for removing particles of contaminants from a fluid passed through said canister;
a seal, comprising a ring of sealant in solid state located at said peripheral edge, sealing said wall to said peripheral edge; and
sealant deflecting means including a sealant deflection surface, situated between one of said inlet and said outlet and said particulate filtering means and forming a part of said canister assembly, at least a portion of said sealant deflection surface being situated directly below said one of said inlet and said outlet with there being free passage between said sealant deflecting surface and said peripheral edge, for deflecting said sealant when in a liquid state toward said wall in the forming of said seal, so that said sealant strikes said wall to form said seal between said edge and said wall when said sealant in said liquid state is deposited on said sealant deflecting means through said one of said inlet and said outlet while said filter canister assembly, and thus said sealant deflecting means, is spinning as a part of sealing carried out on said filter canister assembly;
whereby, said fluid to be filtered passes by said deflecting means and through said particulate filtering means when passing from said inlet to said outlet.

2. The apparatus of claim 1, wherein said sealant deflection means includes a plurality of vanes.

3. The apparatus of claim 2, wherein said vanes are curved.

4. The apparatus of claim 2, wherein said vanes are straight and extend radially from a center of said sealant deflection surface.

5. The apparatus of claim 2, wherein said deflection means is coupled to a support substrate and extends proud of said substrate.

6. The apparatus of claim 1, further comprising centering means for retaining said deflection means under one of said inlet and outlet.

7. The apparatus of claim 6, wherein said centering means comprises means for attaching said sealant deflector to said housing.

8. The apparatus of claim 6, wherein said centering means comprises means for self-centering said deflection means beneath one of said inlet and outlet.

9. The apparatus of claim 8, wherein said self-centering means comprises a plurality of arms extending outward radially from said sealant deflection means.

10. The apparatus of claim 9, wherein said arms include a ribs on an underside thereof having a geometry which provides minimal surface area contact with said particulate filter.

11. The apparatus of claim 9, further comprising a plurality of braces connecting adjacent pairs,, of said arms.

12. The apparatus of claim 11, wherein said braces are curved.

13. The apparatus of claim 11, further comprising spacing means for spacing said braces from said wall.

14. The apparatus of claim 6, wherein said centering means comprises affixing means for affixing said sealant deflector to said particulate filter.

15. The apparatus of claim 14, wherein said particulate filter comprises a pleated paper filter and wherein said affixing means includes a plurality of legs inserted between pleats in said particulate filter.

16. The apparatus of claim 6, wherein said sealant deflector means is molded as an integral part of said housing.

17. The apparatus of claim 16, wherein said sealant deflector means includes a plurality of vanes.

18. The apparatus of claim 17, wherein said housing includes a top having a plurality of reinforcement ribs, and wherein said vanes extend radially outward from a center of said sealant deflector leading toward a space between adjacent reinforcement ribs.

19. A filter canister assembly, comprising:
a housing having a wall and an inlet and an outlet;
particulate filtering means, having a peripheral edge and disposed within said housing with said peripheral edge adjacent said wall, for removing particles of contaminants from a fluid passed through said canister;
sealant deflecting means including a plurality of vanes standing proud of a support substrate, situated between said particulate filtering means and said one of said inlet and outlet with there being free passage between said vanes and said peripheral edge, said sealant deflecting means forming a part of said canister assembly, for deflecting a sealant when in a liquid state toward said wall so that said sealant strikes said wall to form a seal between said edge and said wall when said sealant is deposited on said sealant deflecting means through said one of said inlet and outlet while said filter canister, and thus said sealant deflecting means, is spinning as a part of sealing carried out on said filter canister assembly;
a sealant ring, comprising a ring of said sealant in a solid state, located at said peripheral edge and sealing said wall to said peripheral edge; and
self-centering means for centering said sealant deflecting means under said aperture, said self-centering means including four arms extending outward radially from said sealant deflection means and two curved braces connecting pairs of said arms;
whereby, said fluid to be filtered passes by said deflecting means and through said particulate filtering means when passing from said inlet to said outlet.

20. A sealant deflector for deflecting sealant toward a wall of a fluid filter housing during sealing in assembly of said fluid filter, said fluid filter including an inlet and an outlet with a filtering media situated therebetween, comprising:

deflecting means including a deflection surface for receiving a quantity of sealant in liquid state through one of said inlet and outlet while said deflecting means is rotating within said fluid filter housing during said sealing step and for flinging said sealant outward;

support means for carrying said deflecting means;

fixing means for permanently fixing said support means and thus said deflecting means in a predetermined location below one of said inlet and outlet within said fluid filter housing; and said fixing means further comprising self-centering means, for disposing said support means in a central area of said fluid filter, including a plurality of arms extending radially from said support means.

21. The apparatus of claim 20, wherein said deflecting means includes a circular edge from which said sealant is flung.

22. The apparatus of claim 20, wherein said deflecting means includes a disk shaped deflection means.

23. The apparatus of claim 20, further comprising an aperture passing through said support means to provide a path for fluid to flow.

24. The apparatus of claim 20, wherein said deflecting means includes a plurality of vanes.

25. The apparatus of claim 24, wherein said vanes include a plurality of straight vanes arranged in a spoke configuration to extend radially from a central area of said support means.

26. The apparatus of claim 24, wherein said vanes include a plurality of curved vanes.

27. The apparatus of claim 20, further comprising bracing means for connecting two of said plurality of arms and providing mechanical stability thereto.

28. The apparatus of claim 27, further comprising spacing means for spacing said bracing means from a structure internal to said fluid filter.

29. The apparatus of claim 27, wherein said plurality of arms comprise four arms extending radially from said support means and wherein said bracing means comprises curved braces interconnecting two adjacent pairs of said arms to form an approximately bow-tie shaped structure.

* * * * *

US005062874B1

REEXAMINATION CERTIFICATE (3581th)

United States Patent [19]
[11] B1 5,062,874

Legare et al.

[45] Certificate Issued Jul. 28, 1998

[54] FILTER SEALING APPARATUS

[75] Inventors: Pierre Legare, Ontario, Canada; David W. Pike, Salisbury, England

[73] Assignee: Her Majesty the Queen in right of Canada, as represented by the Minister of National Defence of Her Majesty's Canadian Government, Ottawa, Canada

Reexamination Request:
No. 90/004,606, Mar. 28, 1997

Reexamination Certificate for:
Patent No.: 5,062,874
Issued: Nov. 5, 1991
Appl. No.: 533,626
Filed: Jun. 5, 1990

[51] Int. Cl.$^6$ .......... B01D 50/00
[52] U.S. Cl. .......... 55/337; 55/456; 55/502; 96/134; 239/524; 277/316; 277/650; 277/918
[58] Field of Search .......... 55/337, 502, DIG. 5, 55/DIG. 33, DIG. 35, 318, 497, 456, 499, 521; 239/524; 277/1; 128/206.17, 201.25, 205.27, 205.28, 205.29; 261/94–98

[56] References Cited

U.S. PATENT DOCUMENTS

| | | | |
|---|---|---|---|
| 3,465,413 | 9/1969 | Rosaen et al. | 55/521 X |
| 4,122,011 | 10/1978 | Strigle, Jr. | 261/94 X |
| 4,543,112 | 9/1985 | Ackley et al. | 55/502 X |
| 4,548,626 | 10/1985 | Ackley et al. | 55/DIG. 35 |
| 4,714,486 | 12/1987 | Silverthorn | 128/205.28 X |
| 4,750,923 | 6/1988 | Haruta et al. | 55/337 X |
| 5,063,926 | 11/1991 | Forsgren et al. | 128/206.17 |

*Primary Examiner*—Richard L. Chiesa

[57] ABSTRACT

A filter canister assembly utilizes a sealant deflector to seal a particulate filter to the canister wall, even after the canister is sealed. The canister housing has a wall and an aperture with a particulate filter disposed therein. The particulate filter has an edge adjacent the wall, and is designed for removing particles of contaminants from a fluid, such as air, passed through the canister. A sealant deflector includes a plurality of vanes standing proud of a support substrate, and is situated between the aperture and the particulate filter and forms a permanent part of the canister assembly. The sealant deflector deflects a sealant in liquid state toward the wall to form a seal between the edge and the wall when the sealant is deposited on the sealant deflector while spinning. This deposits a sealant ring sealing the wall to the edge. The sealant deflector is self-centered under the aperture, by a bow-tie shaped structure of four arms extending outward radially from the sealant deflector connected in pairs by curved braces.

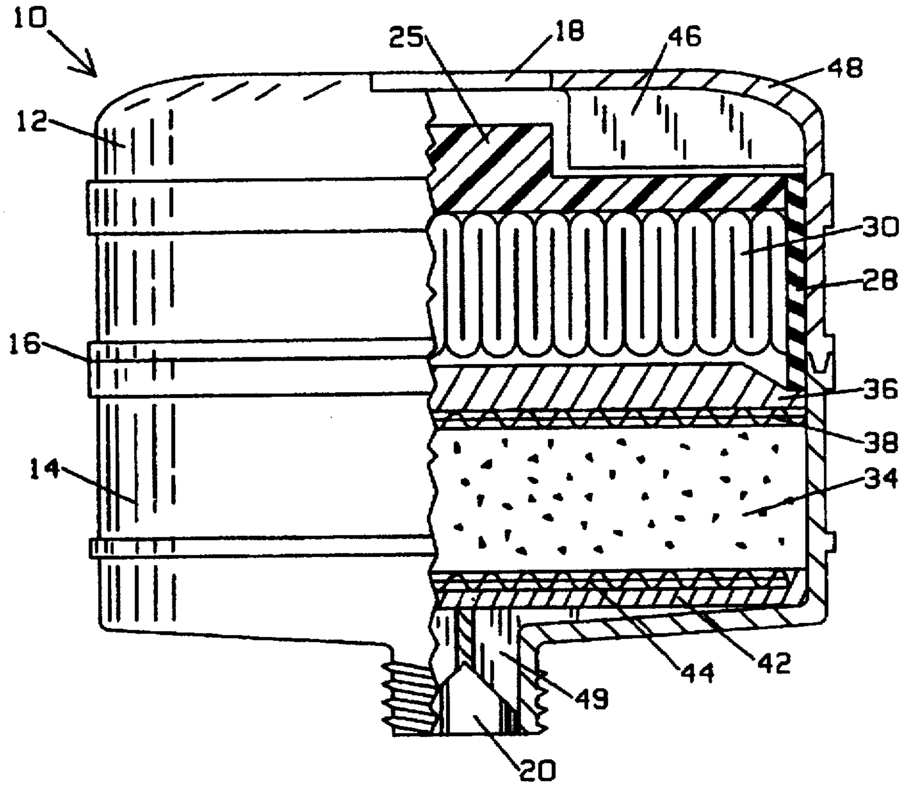

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 and 18–29 is confirmed.

Claim 16 is cancelled.

Claim 17 is determined to be patentable as amended.

New claims 30 and 31 are added and determined to be patentable.

17. The apparatus of claim [16] *6*, wherein said sealant deflector means includes a plurality of vanes.

*30. The apparatus of claim 13 wherein said plurality of braces include two pair of radially inner and radially outer braces and wherein said spacing means include a spacer at the end of each of said plurality of arms located radially beyond said radially outer braces.*

*31. The apparatus of claim 29 wherein said curved braces include two pair of radially inner and radially outer braces and wherein a spacer is located at the end of each of said plurality of arms radially beyond said radially outer braces.*

* * * * *